Dec. 6, 1960     G. MEISTER ET AL     2,963,611
INCANDESCENT LAMP
Filed Jan. 20, 1956
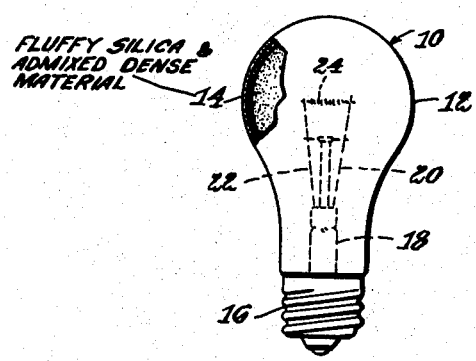
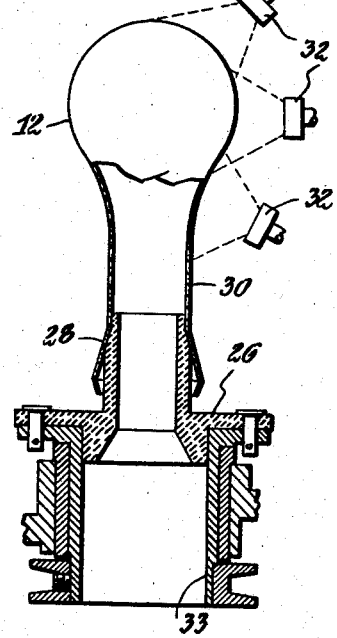
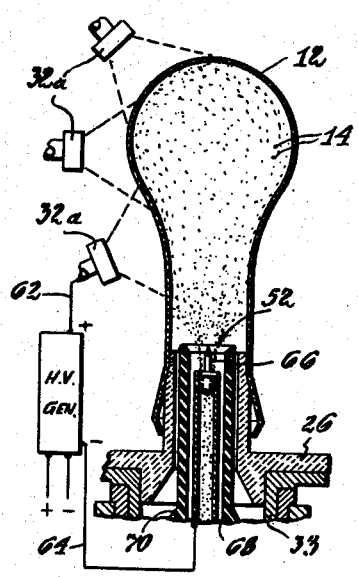
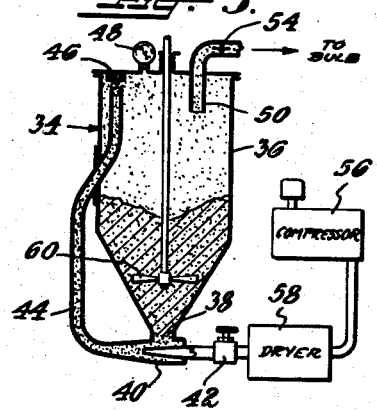
INVENTORS
GEORGE MEISTER,
W. J. MONAHAN
L. C. WERNER.
ATTORNEY.

United States Patent Office

2,963,611
Patented Dec. 6, 1960

2,963,611

INCANDESCENT LAMP

George Meister, Newark, William J. Monahan, Preakness, and Leo C. Werner, Cedar Grove, N.J., assignors to Westinghouse Electric Corporation, East Pittsburgh, Pa., a corporation of Pennsylvania Filed Jan. 20, 1956, Ser. No. 560,301

5 Claims. (Cl. 313—116)

This invention relates to incandescent lamps and, more particularly, to light-diffusing coatings for incandescent lamp envelopes.

There is disclosed in copending application, S.N. 560,441, now Patent No. 2,922,065, titled "Incandescent Lamp," filed concurrently herewith, by Cerulli and Meister, one of the coinventors herein, and owned by the present assignee, a silica-coated incandescent lamp wherein the envelope may be coated with a silica coating of low bulk density, which coating is preferably electrostatically deposited. When coated onto a normally-transparent envelope, this low-bulk-density silica coating serves to obscure or cover the filament with a minimum of light absorption because of the low bulk density of the silica coating.

Some trouble has been encountered with such a low-bulk-density silica coating with regard to the coating blowing off at the neck of the lamp, when the lamp is gas flushed through its exhaust tubulation. Also, some troubles occasionally occur on the major portions of the envelope due to so-called pin holes, which are slight imperfections appearing in the coating. Neither the so-called "neck blows" nor the "pin holes" appreciably affect the appearance of the lamp in the burned or lighted condition, for the eye is too insensitive under the even illumination of the silica coating to be able to detect small coating imperfections, particularly at the neck which is a relatively dark portion of the lamp due to its orientation with respect to the incandescent filament. These neck-blow and pin-hole imperfections may be avoided by steaming the lamp envelope, that is, by densifying the silica coating by injecting into the coated envelope a cloud of steam which condenses on the envelope. This so-called steaming has its drawbacks since more coating is required for an equivalent light-scattering, resulting in increased light absorption by the silica coating. Also, where steaming is employed, substantially all of the water must be lehred from the envelope before it is exhausted, gas filled and sealed in order to inhibit the well-known, so-called water cycle, which shortens the life of the lamp and decreases its so-called lumen maintenance.

It is the general object of this invention to avoid and overcome the foregoing and other difficulties of and objections to the practices of the prior art by improving the adherence of the silica to the envelope without affecting the light-scattering properties of the silica coating.

It is another object of this invention to provide a separate layer of coating material which will mask any imperfections in the primary layer of efficient light-scattering silica.

It is a further object of this invention to provide a separate layer of coating material which will mask any imperfections in the primary layer of efficient light-scattering silica, which primary layer of silica has an addition thereto to further improve its adherence.

The aforesaid objects of the invention, and other objects which will become apparent as the description proceeds, are achieved by admixing with the silica coating a small amount of high-density, substantially white, light-scattering material. If a normally-transparent envelope is to be coated, the envelope may be provided with a first coating of highly-adherent, substantially white material, followed by an efficient light-scattering coating of silica, either with or without an addition of a small amount of finely-divided, substantially white material having a high density.

For a better understanding of the invention, reference should be had to the accompanying drawing wherein:

Fig. 1 illustrates an incandescent lamp carrying on the interior surface of the envelope a coating of finely-divided, silica having admixed therewith a high-density, finely-divided, substantially white material.

Fig. 2 represents the first step in applying the coatings of this invention;

Fig. 3 represents a smoke generator for finely-divided, light-scattering material.

Fig. 4 illustrates the coating operation in applying the finely-divided material coating to the incandescent lamp envelope;

Fig. 5 illustrates a section of the envelope of an incandescent lamp, as shown in Fig. 1, but wherein the envelope is normally-transparent and carries on its internal surface a double coating, the first coating being packed to a relatively high bulk density, and the second interior coating being a low-bulk-density coating which is a very efficient light-scattering medium.

It is disclosed in the heretofore-mentioned Meister and Cerulli patent that when finely-divided, light-scattering material is coated on an incandescent lamp envelope to a relatively low bulk density, the light-scattering properties of the coating material are improved. As noted in the aforementioned Meister and Cerulli patent the bulk density represents the total weight of coating material contained in a definite volume, e.g., grams per cubic cm. This is particularly useful in coating clear-glass envelopes where the filament may be covered or hidden with a minimum amount of coating material, thus minimizing the light absorption encountered in the coating material. In addition, when coating an inside-frost type of envelope, the improved light-scattering properties of the coating material are beneficial, although not as noticeable as when coating a clear-glass type of envelope. Also, when coating silica, as mentioned in the aforementioned Meister and Cerulli patent, the silica coating may be rendered a moisture getter to improve the lumen maintenance of the lamp. As disclosed in this patent, if the improved light-scattering properties for the coating material, preferably silica, are to be realized fully, the silica coating should have an average coating thickness of at least 35 microns and a coating bulk density of from 0.04 to 0.094 gm./cm.$^3$. Dividing these coating densities by the true density of silica, taken as 2.2 gms./cm.$^3$, to determine the so-called, permissible coating density ratio, it is found that the permissible silica coating density ratio is from 0.018 to 0.043. With the minimum average coating thickness of 35 microns and the minimum permissible density ratio, it has been found that there is insufficient coating material to realize adequate light-scattering properties for the coating material and in order to insure an adequate amount of coating material, it has been found that the product of average coating thickness in microns and the coating density ratio, as defined, should be at least 0.9. Thus for a silica coating, the coating material bulk density to true material density ratio should be from 0.018 to 0.043, with the coating thickness being at least 35 microns and the product of coating thickness in microns and the coating density ratio being at least 0.9. The preferred coating thickness is from 45 to 70 microns with a preferred density ratio of from 0.025 to 0.034.

When a coating material is coated to a relatively high bulk density, the adherence of the coating for the envelope is improved. This is understandable since a densely-packed coating will not be blown about as readily by an air stream as a very fluffy coating. For example, if feathers were to be wetted down so as to pack them together, they would not blow away as readily as dry and fluffy feathers. Of course, the bulk density for the matted-down feathers is much greater than the bulk density of the dry, fluffy feathers. This analogy is applicable to a silica coating, which may be wetted down to densify it, or may be very fluffy. Unfortunately, as noted heretofore, when the coating bulk density in the case of finely-divided, light-scattering material increases, the light-scattering properties of the coating material decrease, so that if the silica, for example, is densified to increase its resistance toward blowing off at the neck, the light-scattering properties are deleteriously affected.

It has been found that by adding a limited amount of finely-divided substantially white material having a relatively high true density to a silica coating, the light-scattering properties of the silica may be maintained while still improving the adherence of the silica, i.e., its resistance toward blowing away from the coated envelope. The actual or true density for the material to be admixed with the silica should be at least about 4 gms./cm.$^3$ to be effective in improving adherence, and the amount of this material additive may be from 0.3 percent to ten percent by weight of the silica coating. Titania has proved to be excellent as an additive and has a true density of approxmiately 4.2 gms./cm.$^3$. Other finely-divided, substantially-white materials having a density of at least about 4 gms./cm.$^3$ may be used within the prescribed amounts to improve the adherence, examples being barium titanate and zirconia. Below 0.3% by weight of additive, the effect is negligible, and over 10% by weight of additive the light-scattering properties of the coating are deleteriously affected. The density ratio of the silica coating is unaffected by the small amount of material addition, but above the maximum permissible amount of additive material, i.e., 10%, the coating density ratio is increased, to which the deleterious effects on the light-scattering properties of the coating are attributed. Likewise, the preferred density ratios and coating thicknesses are unaffected with less than an addition of 10% by weight.

The reason for the increased adherence of the silica for the envelope when using an additive as prescribed is not definitely understood, but it is most likely attributed to the fact that a higher density material has more inertia and that the admixed small amounts of high-density material provide an anchoring effect on the surrounding, relatively low coating density or fluffy silica.

The silica to be coated and the high-density additive thereto should be thoroughly admixed before coating. Also, these materials should be finely-divided although the state of division is not particularly critical, materials in the range of 0.02 micron to slightly over 1 micron average ultimate particle size having been coated to produce generally satisfactory results. In order to insure a complete admixture of the silica and the additive, for example, 0.5% by weight of titania, the admixed material may be ground in an air-velocity type grinder such as marketed under the trademark "Micronizer" by Sturtevant Mill Co., Boston, Mass., or as marketed under the trademark "Wheeler Mill" by C. H. Wheeler Mfg. Co., Philadelphia, Pa.

In Fig. 1 is illustrated an admixed silica-0.5% $TiO_2$ coated lamp 10 comprising a light-transmitting, vitreous envelope 12 carrying an internal coating of admixed silica and titania 14 and having a mount sealed to the neck thereof. A brass or aluminum screw-type base 16 is cemented to the neck to facilitate connection to a power source, as is usual. As is well known, the mount comprises a vitreous re-entrant stem press 18 having lead-in conductors 20 and 22 sealed therethrough and supporting a refractory metal filament 24, such as tungsten, between their inwardly-extending extremities. The envelope preferably contains inert gases such as nitrogen, argon, krypton, etc. or mixtures thereof, as is well-known, although the lamp may be a vacuum type.

The preferred method for applying the silica admixed with the high-density material to an incandescent lamp envelope, either clear glass or inside frost, is by an electrostatic process. In the electrostatic process of applying the diffusing silica-titania coating, for example, to the inner surface of the unsealed bulb, the open-necked bulb is first placed over and supported by a hollow lava chuck 26, as illustrated in Fig. 2, which chuck cooperates with the bulb cullet 28 and bulb neck 30 to support the bulb. While thus supported, the bulb is rotated either manually or by a belt drive (drive unit not shown) and heated by gas-air burners 32 to approximately 100° C. Because of the negative temperature coefficient of resistance of glass, this heating renders the envelope substantially uniformly electrically-conductive. The heating temperature of 100° C. is given only by way of example and not by way of limitation since the temperature to which the glass is heated to render it electrically-conductive is not particularly critical and may be varied considerably according to the type of glass being heated, heating temperatures of from 70° C. to 300° C. having been used. It should be noted that most incandescent lamp bulbs are fabricated of the well-known lime glass.

As illustrated, the insulating lava chuck 26 of the electrostatic coating apparatus is affixed to a collar 33, which is insulated from the bulb by the chuck, to allow the bulb to be rotated readily either manually or automatically during the heating and later steps of the process.

There is illustrated in Fig. 3 a smoke-generator unit 34 for producing a smoke of finely-divided, light-scattering material particles suspended in air prior to electrostatic deposition of the powder. The smoke generator generally comprises a material powder and material smoke reservoir 36 having an outlet 38 at the bottom thereof through which the coating material is admitted into a mixing venturi 40. Compressed air is admitted to the venturi through a pressure regulating valve 42 and thence to the venturi where the finely divided silica-titania, for example, is picked up and carried through a feed conduit 44 to cause the air-particle mixture to impinge upon a target 46 to break-up particle agglomerates which might have formed and to disperse thoroughly the coating material to form a smoke of finely-divided particles suspended in the air vehicle.

For the specific embodiment of the smoke nozzle, which will hereinafter be illustrated and described, it is preferable to maintain a smoke pressure within the reservoir 36 between 6 and 12 pounds to cause the smoke to pass through the smoke nozzle at a desirable velocity. To maintain the smoke pressure in the reservoir within these aforementioned preferred pressure limitations, an indicating gauge 48 is provided from which the operator may have a visual indication so that the pressure regulating valve 42 may be manually adjusted to maintain the smoke pressure in the reservoir within the aforementioned preferred pressure limitations. Such pressure-indicating and pressure-regulating valves are well-known. A smoke-nozzle conduit 50 connects the smoke reservoir with the injector nozzle assembly 52, as shown in Fig. 4. To control the flow of smoke to the nozzle assembly, a manually-operable butterfly valve 54 is provided in the conduit 50.

The air compressor 56 which supplies air to the smoke generator unit is preferably regulable between 2 lbs. and 20 lbs. output pressure and an air dryer 58, such as a well-known aluminum-oxide type air dryer is provided in the output line of the compressor so that the coating material powder may be maintained under substantially water-vapor-free conditions until it is forced into the uncoated bulb. A power driven agitator 60 (power source not shown) is provided near the base of the reservoir to agitate continually the finely-divided coating material to keep it in a finely-divided state and break up particle agglomerates.

In Fig. 4 is shown the coating operation for the bulb. The positive pole 62 of a high-tension, direct-current source is electrically connected to the gas burner unit 32ᵃ and the negative pole 64 is electrically connected to a probe 66 which projects through the hollow lava chuck 26 into the lower extremities of the bulb neck. If desired these polarities may be reversed with but little effect on the resultant coating. The magnitude of the applied D.C. voltage is not particularly critical and may vary between about 8 kv. and 25 kv., a specific example being 15 kv.

The silica smoke injector nozzle assembly 52 is circumferentially disposed about the probe 66, and the nozzle assembly connects with the nozzle conduit 50 of the smoke generator. The air which is present in the bulb and the coating material smoke which does not deposit on the bulb wall during coating passes through a return conduit 68 which is disposed about the nozzle assembly 52 and nozzle conduit 50 and which discharges into a collecting hopper (not shown) so as to collect the uncoated silica-titania, for example, for reprocessing and further use. A conduit support collar 70 supports the probe- and nozzle-conduit assemblies and may be positioned longitudinally with respect to the lava chuck and bulb neck either manually or automatically.

As a specific example for coating a bulb designed for a 100 w. lamp with a silica-0.5% titania coating material, the nozzle injector assembly may have eight evenly spaced nozzles circumferentially disposed about the probe and each having a small diameter. In coating a bulb adapted for 100 watt operation, the butterfly valve 54 may be opened for about 2 seconds while applying a high tension D.C. of 15 kv. between the bulb wall and the probe. This will deposit approximately 50 mg. of silica-0.5% titania onto the bulb.

After being coated with the light-scattering material, the coated bulb is preferably baked or lehred while rotated on the lava chuck, such baking or lehring techniques being known in the art. Lehring temperatures of 450° C. may be used, although there is nothing particularly critical about the lehring temperature. It is desirable to flush simultaneously the coated bulb with hot, dry air at a temperature of about 250° C., for example, while lehring to drive off all possible moisture within the bulb.

Immediately following the lehring operation and while the bulb is still hot, the mount is sealed in by well-known techniques. It is desirable, although not mandatory, to flush the bulb with hot, dry nitrogen, or other inert gas, while sealing the mount to the bulb neck in order to remove any moisture which may accumulate from the sealing fires, which are normally provided by gas-air burners, as is usual. Such hot, dry-nitrogen flushing is preferably accomplished through the exhaust tube of the mount 18 in order to maintain a slight pressure within the bulb to force any moisture out of the neck.

Immediately following the sealing-in operation, and while the envelope is still hot, the lamp is exhausted through the exhaust tube, the envelope flushed with dry nitrogen, the gas-fill inserted and the exhaust tube tipped-off, as is customary. It may be desirable to further bake the bulb on exhaust, although baking on exhaust is not absolutely necessary.

After tipping-off, the lamp base is cemented to the neck and the lead-in conductors connected by well-known lamp basing techniques.

Small imperfections in the coating, particularly small blow areas at the neck of the lamp, arising during the gas-flushing operation from the gas stream impinging on the lamp neck may be masked through the addition of a separate layer of material which is coated to a high bulk density, as compared to that of the loosely-packed silica coating. It has been found that if the coating material density ratio is at least 0.051, the coating material will adhere very well to the envelope under the conditions to which the coating material is subjected during the coating operation. This represents an extra step in the coating operation, namely, the application of two coatings which are heterogeneous and the coating operations must be duplicated to achieve such heterogeneous coatings. Such a two-coat procedure will normally be limited to a normally-transparent envelope where the slight added manufacturing costs required by the two-coat process will be more than offset by the savings in the cost of applying the acid-etched inside frost to the glass.

Following is a table, designated as Table I, in which are listed coating material bulk densities and the corresponding coating material density ratio, that is, the coating material bulk density divided by the coating material true density. In all of these materials as listed, the coating material will have sufficient adherence for the glass to withstand the shocks of manufacture. It should be noted that these materials, as coated to the specified density ratios, will not effect what is known as filament coverage when coated onto normally-transparent glass unless the coating is excessively light absorptive, but the coating materials, as indicated in Table I, will effect a masking of any slight imperfections which may occur in the primary light-scattering layer of finely-divided, low-bulk-density silica.

*Table I*

| Coating Material | Average Coating Bulk Density (gms./cm.³) | Average Coating Density Ratio |
|---|---|---|
| Silica applied by burning ethyl orthosilicate | 0.112 | 0.051 |
| Silica applied by flush techniq.e (butyl acetate with nitrocellulose binder) | 0.31 | 0.14 |
| Titania applied by electrostatically depositing | 0.31 | 0.074 |
| Silica-electrostatically-deposited and later steamed to densify | 0.22 | 0.1 |
| Barium Zirconate-electrostatically applied | 0.55 | 0.1 |
| Zirconia-electrostatically applied | 0.91 | 0.16 |

NOTE.—True density of silica taken as 2.2; titania, 4.2; barium zirconate, 5.52; zirconia, 5.7 gms./cm.³.

In order to mask imperfections in the primary light-scattering silica coating, any of the foregoing materials may be first deposited on the interior surface of the envelope and adjacent thereto. These materials should be finely-divided and substantially white so as not to introduce unwanted coloring and absorption bands. The actual volume of weight of deposited material in order to achieve an equivalent masking effect will vary greatly depending on the material which is coated, but as a practical matter it has been found that for any appreciable masking of imperfections, the first or masking, high-bulk-density coating should have a light-absorption of at least 0.3%. In order not to introduce excessive light absorption into the coated envelope so as to render the coating non-competitive, the first or masking coating should not have more than 3.5% light absorption. These absorption measurements were made by placing coated bulbs over a standard light source in a photometry sphere, and comparing the light absorbed to the light absorbed by an uncoated, normally-transparent envelope. As a specific example, titania may be electrostatically deposited by a method as hereinbefore outlined, substituting titania for the silica-titania mixture. The titania may be coated to an amount which will absorb approximately 2% additional light, which amount of coating will give the lamp in the unburned condition a very even, white appearance.

The actual thickness of such a coating is quite small, being in the order of 5 microns.

Silica is thereafter electrostatically applied to the interior surfaces of the normally-transparent envelope, over the first or masking coating of titania, in order to provide the light-scattering properties which give the lamp an even, esthetic appearance. In order to realize the maximum, light-scattering properties for the coated silica, the properties of the coating should be as outlined hereinbefore for the silica-high density material admixture; namely, a minimum average silica coating thickness of 35 microns with a density ratio of from 0.018 to 0.043 and with the product of coating thickness in microns and the coating density ratio being at least 0.9.

Summarizing, the first or masking coating of finely-divided, substantially white material should have a coating bulk density to true material density ratio of at least 0.051 and a light absorption of from 0.3% to 3.5%. The second layer of finely-divided, light scattering silica should have a minimum average coating thickness of 35 microns with a density ratio of from 0.018 to 0.043 and with the product of coating thickness in microns and the coating density ratio being at least 0.9.

Of course, other materials as indicated in Table I would also be satisfactory, as a first or masking coating, and any other finely-divided, substantially white material coated to at least the prescribed density ratio of 0.051 would also be suitable for masking. Table I also indicates coating materials which are deposited by other than an electrostatic process, and while these materials would be satisfactory as far as the improvement is concerned, it is advantageous, from the standpoint of production and cost, to utilize a material which may be deposited electrostatically to a relatively high density ratio, such as titania, barium zirconate, and zirconia, to name a few.

As examples of materials which may be coated to a density ratio of at least 0.051 by other than an electrostatic process, silica may be deposited by burning ethyl orthosilicate, as outlined in Patent No. 2,545,896. Also, the silica may be applied to a high density ratio by flushing processes which are known, for example, by suspending silica in a solvent of butyl acetate with a nitrocellulose binder. In addition, the silica may be electrostatically deposited for the first or masking coating and then steamed to wet down and densify the coating.

In the operation of this plural coating, the first or masking coating is applied adjacent to the interior surface of the envelope, preferably by an electrostatic process as hereinbefore outlined. The primary, light-scattering layer of silica is then deposited onto the first-applied layer by the electrostatic process as outlined. The lamp is then lehred, the mount sealed in, and the lamp evacuated. On insertion of the gas flush through the exhaust tubulation, some of the silica coating may tend to blow off of the neck portion of the envelope at a position adjacent the exhaust tubulation outlet. The masking or first layer of relatively high-bulk-density coating material will not blow off, however, because of its compact nature. This portion of the lamp receives very little direct light from the filament so that little light scattering properties are required for the coating on this portion of the envelope, but on the sales counter, a "blow-off" area on the neck of the lamp constitutes a flaw. This blow-off area is, of course, concealed by the adhering masking layer so that the lamp envelope coating appears to be substantially continuous. The same reasoning applies to so-called pin holes which may appear throughout the coating. These are so small as to have substantially no effect on the light-scattering properties of the coating, but they do constitute a noticeable defect in the lamp in its unburned condition, which defects are masked by the first adherent, high-density-ratio coating.

It should be noted that while incandescent lamps are normally considered to have utility only when burning, they also constitute an integral part of every lamp fixture, and while the appearance of the lamp in the operating condition is of primary importance, the appearance of the lamp in the unburned condition is an important, esthetic part of the fixture.

In order to further improve the envelope coating, a plural layer, as hereinbefore defined, may be utilized, but the second coating, instead of being silica per se can be a mixture of silica with an addition of from 0.3% by weight to 10% by weight of a material having a density of at least about 4 gm./cm.³. This will further minimize any tendency for so-called neck-blow areas and for the so-called pin hole imperfections. The first or masking layer of material can then be applied so as to have a minimum of light-absorption since the margin of safety regarding the formation of the neck-blow areas has been increased. In such an embodiment, the requirements for the two coatings are unchanged from those noted heretofore regarding the density ratio and absorption for the first or masking coating and the minimum thickness, bulk density and minimum amount of material for the primary or light-scattering coating as outlined hereinbefore.

A section of an envelope carrying a plural coating is illustrated in Fig. 5, wherein the normally-transparent envelope 12a carries a thin, first or masking coating 84 of finely-divided, substantially white material coated to a density ratio of at least 0.051. Over this first masking coating 84 is coated the primary light-scattering layer of finely-divided silica 86, as hereinbefore defined. If desired this silica coating may contain an additive of from 0.3 percent to ten percent by weight of finely-divided, substantially white material having a true density of at least about 4 gms./cm.³ to increase further the ability of the silica coating to adhere to the envelope under manufacturing conditions.

It will be recognized that the objects of the invention have been achieved by the provision of an adhering light-scattering silica coating for an incandescent lamp envelope. If a normally-transparent envelope is utilized, a masking adhering coating may be first applied, which adhering coating will mask any imperfections in the efficient light-scattering coating. Of course, it should be understood that all of the finely-divided coating materials of this invention are intended for light scattering and thus should possess such physical and chemical characteristics that their light-scattering properties are not deleteriously affected by lamp manufacturing schedules or lamp operating conditions.

While in accordance with the patent statutes, one best-known embodiment has been illustrated and described in detail, it is to be particularly understood that the invention is not limited thereto or thereby.

We claim:

1. An incandescent lamp having a light-transmitting envelope and carrying on the internal surface of said envelope a coating principally comprising finely-divided silica, said silica coating having an average coating thickness of at least 35 microns and a coating bulk density to coating material true density ratio of from 0.018 to 0.43 with the product of coating thickness in microns and the coating density ratio being at least 0.9, and said silica having admixed therewith from 0.3 percent to 10 percent by weight of finely-divided, substantially white material having a true density of at least about 4 gms./cm.³.

2. An incandescent lamp having a light-transmitting envelope and carrying on the internal surface of said envelope a coating principally comprising finely-divided silica, said silica coating having an average coating thickness of from 45 to 70 microns and a coating bulk density to coating material true density ratio of from 0.025 to 0.034, and said silica having admixed therewith from 0.3 percent to 10 percent by weight of finely-divided, substantially white material having a true density of at least about 4 gms./cm.³.

3. An incandescent lamp having a light-transmitting envelope and carrying on the internal surface of said envelope a coating principally comprising finely-divided silica, said silica coating having an average coating thickness of from 45 to 70 microns and a coating bulk density to coating material true density ratio of from 0.025 to 0.034, and said silica having admixed therewith from 0.3 percent to 10 percent by weight of finely-divided titania.

4. An incandescent lamp having a normally-transparent envelope and carrying on the internal surface of said envelope a first coating of finely-divided titania, said titania coating having a coating bulk density to true density ratio of about 0.07 and a thickness such that said first titania coating has from 0.3% to 3.5% light absorption, a second coating comprising finely-divided silica carried interiorly of said first coating and adjacent thereto, said silica second coating having an average coating thickness of from 45 to 70 microns, and a coating bulk density to true material density ratio of from 0.025 to 0.034.

5. An incandescent lamp having a normally-transparent envelope and carrying on the internal surface of said envelope a first coating of finely-divided titania, said titania coating having a coating bulk density to true density ratio of about 0.07 and a thickness such that said titania coating has from 0.3% to 3.5% light absorption, a second coating principally comprising finely-divided silica carried interiorly of said first coating and adjacent thereto, said silica second coating having an average coating thickness of from 45–70 microns, and a coating bulk density to true material density ratio of from 0.025 to 0.034 and said silica having admixed therewith from 0.3 percent to 10 percent by weight of finely-divided titania.

References Cited in the file of this patent

UNITED STATES PATENTS

| | | |
|---|---|---|
| 1,552,128 | Ettinger | Sept. 1, 1925 |
| 1,830,165 | Gustin | Nov. 3, 1931 |
| 2,545,896 | Pipkin | Mar. 20, 1951 |
| 2,626,874 | Pipkin | Jan. 27, 1953 |
| 2,661,438 | Shand | Dec. 1, 1953 |

FOREIGN PATENTS

| | | |
|---|---|---|
| 737,861 | Great Britain | Oct. 5, 1951 |
| 737,862 | Great Britain | Oct. 5, 1955 |
| 765,405 | Great Britain | Jan. 9, 1937 |
| 202,231 | Australia | Aug. 25, 1955 |